United States Patent
Lee et al.

(10) Patent No.: US 8,706,154 B2
(45) Date of Patent: Apr. 22, 2014

(54) UPLINK POWER CONTROL METHOD AND APPARATUS IN WIRELESS COMMUNICATION SYSTEM

(75) Inventors: Moon Il Lee, Anyang-si (KR); Seung Hee Han, Anyang-si (KR); Jae Hoon Chung, Anyang-si (KR); Hyun Soo Ko, Anyang-si (KR); Bin Chul Ihm, Anyang-si (KR)

(73) Assignee: LG Electronics Inc., Seoul (KR)

( * ) Notice: Subject to any disclaimer, the term of this patent is extended or adjusted under 35 U.S.C. 154(b) by 242 days.

(21) Appl. No.: 13/320,897

(22) PCT Filed: Jun. 15, 2010

(86) PCT No.: PCT/KR2010/003829
§ 371 (c)(1),
(2), (4) Date: Nov. 16, 2011

(87) PCT Pub. No.: WO2010/147358
PCT Pub. Date: Dec. 23, 2010

(65) Prior Publication Data
US 2012/0082250 A1     Apr. 5, 2012

Related U.S. Application Data

(60) Provisional application No. 61/187,114, filed on Jun. 15, 2009.

(30) Foreign Application Priority Data

May 6, 2010    (KR) .................. 10-2010-0042411

(51) Int. Cl.
*H04W 52/04*    (2009.01)
*H04B 7/00*    (2006.01)

(52) U.S. Cl.
USPC .......................................................... 455/522

(58) Field of Classification Search
USPC .......................................................... 455/522
See application file for complete search history.

(56) References Cited

U.S. PATENT DOCUMENTS

| | | |
|---|---|---|
| 2006/0018397 A1 | 1/2006 | Sampath et al. |
| 2008/0101407 A1* | 5/2008 | Khan et al. ................. 370/468 |
| 2009/0042511 A1* | 2/2009 | Malladi ....................... 455/62 |
| 2009/0154577 A1* | 6/2009 | Lindoff et al. ............. 375/260 |
| 2010/0027697 A1* | 2/2010 | Malladi et al. ............. 375/260 |
| 2010/0034310 A1* | 2/2010 | Nam et al. ................. 375/267 |
| 2010/0041350 A1* | 2/2010 | Zhang et al. .............. 455/101 |
| 2010/0054353 A1* | 3/2010 | Roh et al. .................. 375/260 |
| 2010/0115358 A1* | 5/2010 | Kotecha et al. ........... 714/748 |
| 2010/0172424 A1* | 7/2010 | Perets et al. .............. 375/260 |
| 2010/0195594 A1* | 8/2010 | Seo et al. .................. 370/329 |
| 2011/0044313 A1* | 2/2011 | Jeong et al. ............... 370/344 |

(Continued)

FOREIGN PATENT DOCUMENTS

| KR | 20090042991 | 5/2009 |
|---|---|---|
| KR | 1020090054357 | 5/2009 |

*Primary Examiner* — Gennadiy Tsvey
(74) *Attorney, Agent, or Firm* — Lee, Hong, Degerman, Kang & Waimey (57) ABSTRACT

An uplink power control method and apparatus in a wireless communication system are provided. The uplink power control method in a terminal of a wireless communication system includes mapping one or more codewords to one or more layers, and multiplying the codewords mapped to the layers by a layer power control matrix so as to perform layer power control.

4 Claims, 6 Drawing Sheets

(56) References Cited

U.S. PATENT DOCUMENTS

2011/0122819 A1* 5/2011 Jongren et al. ............... 370/328
2011/0228878 A1* 9/2011 Sorrentino ................... 375/295
2012/0002750 A1* 1/2012 Hooli et al. .................. 375/295

\* cited by examiner

(a) PUSCH  (b) PUCCH

UPLINK POWER CONTROL METHOD AND APPARATUS IN WIRELESS COMMUNICATION SYSTEM

CROSS-REFERENCE TO RELATED APPLICATIONS

This application is a 371 U.S. national stage application of International Application No. PCT/KR2010/003829, filed on Jun. 15, 2010, which claims priority to Korean Application Serial No. 10-2010-0042411, filed on May 6, 2010, and U.S. Provisional Application Ser. No. 61/187,114, filed on Jun. 15, 2009, the contents of which are incorporated by reference herein in their entirety.

TECHNICAL FIELD

The present invention relates to a wireless communication system, and more particularly, to an uplink power control method and apparatus in a wireless communication system.

BACKGROUND ART

First, an uplink power control method of the related art will be described. A main purpose of power control is to compensate for path loss and channel fading so as to guarantee a Signal-to-Noise Ratio (SNR) of a received signal and to improve system throughput by adequate link adaptation. In addition, power control can reduce inter-cell interference. In a 3$^{rd}$ Generation Partnership Project Long Term Evolution (3GPP LTE) system, uplink power control is based on open loop power control involving closed-loop correction. The open loop power control is performed by a terminal and the closed-loop correction is performed by a base station.

Figure 1:
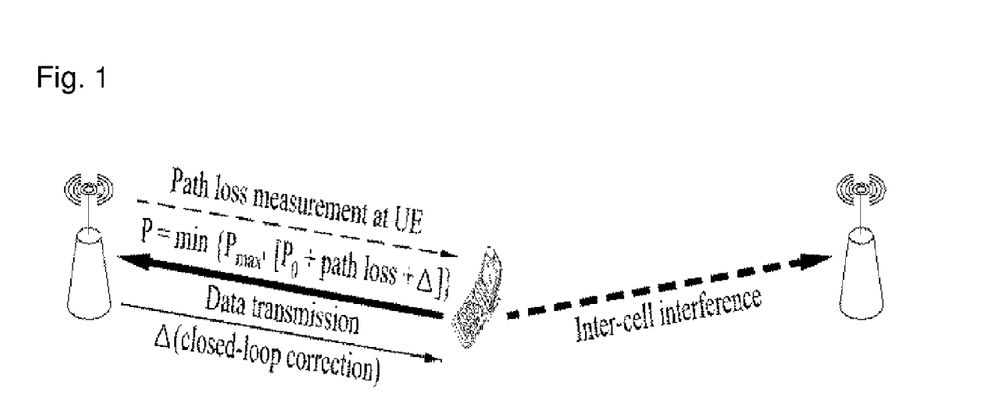
FIG. 1 is a diagram showing the basic concept of uplink power control in a Long Term Evolution (LTE) system.

FIG. 1 shows basic concept of uplink power control in an LTE system.

As shown in FIG. 1, a terminal (User Equipment (UE)) may measure path loss using an open loop scheme and a base station may control uplink power by a closed-loop correction factor Δ. That is, a transmission power value is determined using the path loss measured by the terminal and a power control value received from the base station.

The power of a Physical Uplink Shared Channel (PUSCH) may be determined as expressed by Equation 1.

$$P_{PUSCH}(i)=\min\{P_{MAX}, 10\log_{10}(M(i))+P_o(j)+\alpha(i)\cdot PL+\Delta_{TF}(i)+f(i)\}[dBm] \quad \text{Equation 1}$$

where, i denotes a time index and $P_{MAX}$ denotes allowed maximum power, which is determined by the terminal. M(i) is determined according to allocated resource blocks, has a value of from 1 to 110, and is updated every subframe. f(i) is varied according to terminal and is determined by the base station.

α(i)PL is used to compensate for path loss, wherein PL is downlink path loss measured by the terminal and α(i) is a scaling value. α(i) is equal to or less than 1. If α(i) is equal to 1, path loss is completely compensated for and, if α(i) is less than 1, path loss is partially compensated for.

$P_0(j)$ is calculated by Equation 2.

$$P_O = P_{O\_CELL\_SPECIFIC} + P_{O\_UE\_SPECIFIC} \quad \text{Equation 2}$$

The power of a Physical Uplink Control Channel (PUCCH) is expressed by Equation 3.

$$P_{PUCCH}(i)=\min\{P_{MAX}, P_{O\_PUCCH}+PL+h(n_{CQI}, n_{HARQ})+\Delta_{F\_PUCCH}(F)+g(i)\}[dBm] \quad \text{Equation 3}$$

where, $\Delta_{F\_PUCCH}(F)$ is received from an upper layer and is determined according to the format of the PUCCH.

h(n) denotes a value determined according to the format of the PUCCH, $n_{CQI}$ denotes the number of bits for channel quality information, $n_{HARQ}$ denotes the number of bits for HARQ.

$P_{O\_PUCCH}$ is a sum of $P_{O\_NOMINAL\_PUCCH}$ which is a cell-specific variable and $P_{O\_UE\_PUCCH}$ which is a UE-specific variable.

Power control of a sounding reference signal is expressed by Equation 4.

$$P_{SRS}(i)=\min\{P_{MAX}, P_{SRS\_OFFSET}+10\log_{10}(M_{SRS})+P_{O\_PUSCH}(j)+\alpha\cdot PL+f(i)\} \quad \text{Equation 4}$$

where, $M_{SRS}$ denotes a bandwidth of SRS transmission of a subframe i.

Figure 2:
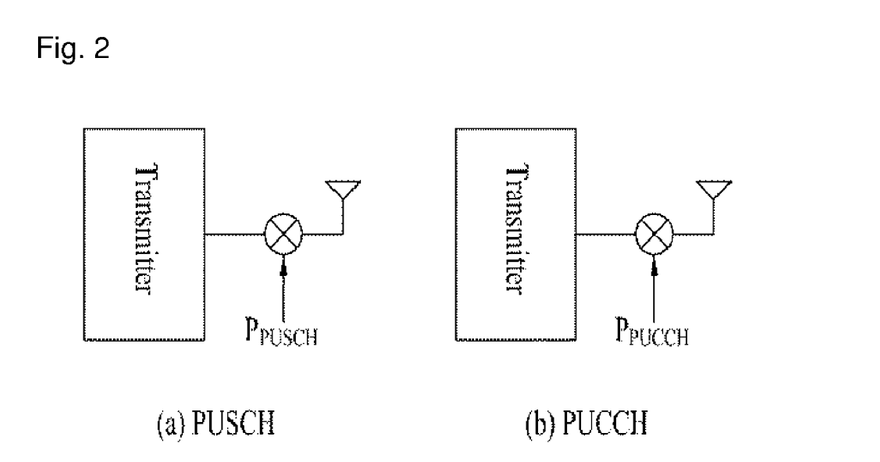
FIG. 2 is a diagram showing an uplink transmission structure of an LTE system.

FIG. 2 is a diagram showing an uplink transmission structure of an LTE system.

As shown in FIG. 2, a PUSCH transmits a value obtained by multiplying a signal to be transmitted by a power value determined by Equation 1 immediately before being transmitted through a physical antenna, and a PUCCH transmits a value obtained by multiplying a signal to be transmitted by a power value determined by Equation 3 immediately before being transmitted through a physical antenna.

In the LTE system, since a single power amplifier is used in uplink, only signal-antenna transmission is possible. However, since multiple antennas may be used in downlink, a problem such as imbalance in maximum or average system throughput between uplink and downlink occurs in the LTE system. Accordingly, in an LTE-Advanced (LTE-A) system, a maximum of four transmission antennas is employed in order to improve uplink system throughput. As described above, in the LTE system, since the number of power amplifiers is one, uplink power control is performed with respect to overall transmission power. However, if single power control is performed when the terminal has a plurality of power amplifiers as in the LTE-A system, efficient power control is impossible and thus a serious problem occurs in power consumption of the terminal.

Accordingly, there is a need for an adequate uplink power control method if a terminal has a plurality of transmission antennas.

Disclosure of Invention

Technical Problem

As described above, since a terminal has a plurality of transmission antennas in a Long Term Evolution-Advanced (LTE-A) system, there is a need for an adequate uplink power control method.

An object of the present invention devised to solve the problem lies on an adequate uplink power control method if a terminal has a plurality of transmission antennas.

Solution to Problem

The object of the present invention can be achieved by providing an uplink power control method in a terminal of a wireless communication system including mapping one or more codewords to one or more layers, and multiplying the codewords mapped to the layers by a layer power control matrix so as to perform layer power control.

At this time, the layer power control matrix may be configured such that the powers of a plurality of layers to which one codeword is mapped are equal.

Information about the layer power control matrix may be received from a base station.

The information about the layer power control matrix may include a power reference value and a difference between the power of each of the layers and the power reference value.

The uplink power control method may further include performing layer shifting for circularly shifting the one or more layers with time.

The uplink power control method may further include multiplying the codewords subjected to the layer power control by a physical antenna power control matrix so as to perform physical antenna power control.

The physical antenna power control matrix may be a diagonal matrix in which all elements of a main diagonal line have the same value.

In another aspect of the present invention, provided herein is a terminal including a reception module configured to receive information about a layer power control matrix from a base station, and a processor configured to map one or more codewords to one or more layers and to multiply the codewords mapped to the layers by the layer power control matrix so as to perform layer power control.

Advantageous Effects of Invention

According to the embodiments of the present invention, it is possible to provide an adequate uplink power control method if a terminal has a plurality of transmission antennas.

BRIEF DESCRIPTION OF DRAWINGS

The accompanying drawings, which are included to provide a further understanding of the invention, illustrate embodiments of the invention and together with the description serve to explain the principle of the invention.

In the drawings.

BEST MODE FOR CARRYING OUT THE INVENTION

Reference will now be made in detail to the preferred embodiments of the present invention, examples of which are illustrated in the accompanying drawings. The detailed description set forth below in connection with the appended drawings is intended as a description of exemplary embodiments and is not intended to represent the only embodiments in which the concepts explained in these embodiments can be practiced. The detailed description includes details for the purpose of providing an understanding of the present invention. However, it will be apparent to those skilled in the art that these teachings may be implemented and practiced without these specific details. For example, although, in the following description, description is given on the assumption that a mobile communication system is a 3GPP LTE/LTE-A system, the present invention is applicable to any mobile communication system except for unique matters of the 3GPP LTE/LTE-A system.

In some instances, well-known structures and devices are omitted in order to avoid obscuring the concepts of the present invention and the important functions of the structures and devices are shown in block diagram form. The same reference numbers will be used throughout the drawings to refer to the same or like parts.

In the following description, it is assumed that a terminal is a generic term of such a mobile or fixed user-end device such as a user equipment (UE), a mobile station (MS) and the like. In addition, it is assumed that a base station is a generic term of any node of a network end, which communicates with a terminal, such as a Node B, an eNode B and the like.

Figure 3:
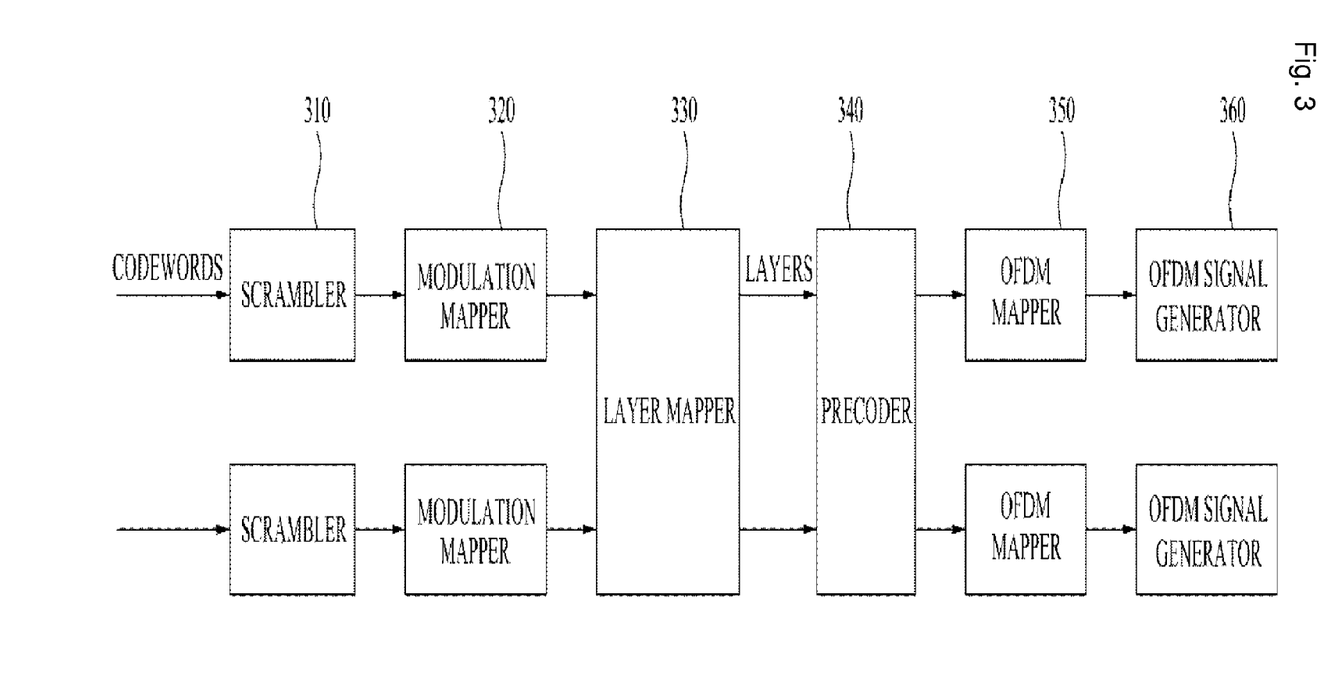
FIG. 3 is a diagram showing an Orthogonal Frequency Division Multiplexing (OFDM)-based transmitter.

First, the structure of an Orthogonal Frequency Division Multiplexing (OFDM)-based transmitter will be described with reference to FIG. 3. FIG. 3 is a diagram showing an OFDM-based transmitter. As shown in FIG. 3, the transmitter includes a scrambler 310, a modulation mapper 320, a layer mapper 330, a precoder 340, an OFDM mapper 350 and an OFDM signal generator 360. The scrambler 310 scrambles input codewords, the modulation mapper 320 modulates the input signals, and the layer mapper 330 maps the input signals to layers. One codeword may be mapped to one layer or layer group, and the same modulation and coding rate are used in one layer or layer group. The transmitter may perform Discrete Fourier Transform (DFT) spreading before precoding the signals, in order to maintain Peak-to-Average Power Ratio (PAPR) characteristics. The precoder 340 multiplies the input signals by a precoding matrix, the OFDM mapper 350 maps the input signals to OFDM symbols, and the OFDM signal generator 360 performs Inverse Fast Fourier Transform on the input signals, adds a Cyclic Prefix (CP) to the transformed signals, and generates OFDM signals.

Next, an uplink power control method according to a first embodiment of the present invention will be described with reference to the drawing.

Figure 4:
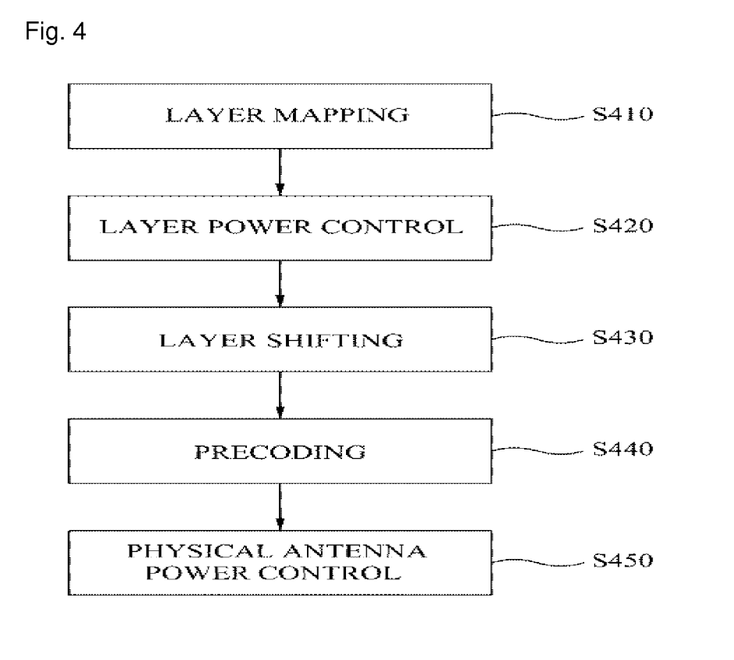
FIG. 4 is a flowchart illustrating an uplink power control method according to a first embodiment of the present invention.

FIG. 4 is a flowchart illustrating an uplink power control method according to a first embodiment of the present invention.

As shown in FIG. 4, a terminal maps codewords to layers (S410).

Figure 5:
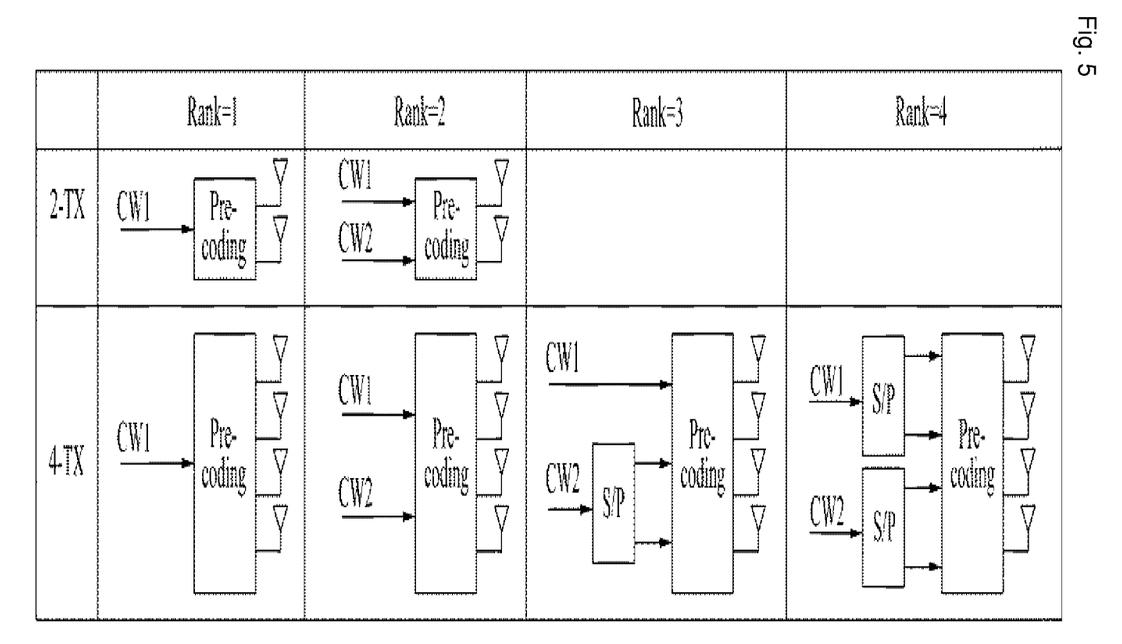
FIG. 5 is a diagram showing an example of a method of mapping codewords to layers.

FIG. 5 is a diagram showing an example of a method of mapping codewords to layers. FIG. 5 shows a method of mapping layers according to ranks if the number of transmission antennas is 2 or 4.

The rank number indicates the number of data streams used to transmit different information through spatial multiplexing in a given channel. A maximum rank number is equal to or less than the number of transmission antennas. Accordingly, if the number of transmission antennas is 2, the rank number may be 1 or 2 and, if the number of transmission antennas is 4, the rank number may be 1, 2, 3 or 4.

The rank number is equal to the number of layers. Accordingly, if the rank number and the number of codewords are equal, the codewords are mapped to the layers in one-to-one correspondence and, if the rank number is greater than the number of codewords, one codeword is mapped to a plurality of layers. In FIG. 5, in the case where the rank number is 3, a codeword 1 is mapped to one layer, and a codeword 2 is mapped to two layers. In the case where the rank number is 4, each of codewords 1 and 2 is mapped to two layers.

The terminal multiplies the codewords mapped to the layers by a layer power control matrix so as to perform layer power control (S420). The terminal receives information about the power control matrix from a base station and multiplies a signal by the power control matrix.

The power of each of the layers may be individually controlled. For example, if the number of layers is 2, the transmission power of a layer 1 may be $P_1$ and the transmission power of a layer 2 may be $P_2$. The base station may inform the terminal of the information about the layer power control matrix indicating the transmission power of each layer.

Equation 5 shows a signal subjected to the layer power control.

$$Px(i) \qquad \text{Equation 5}$$

where, i denotes a modulation symbol index, x(i) denotes transmission data of a modulation symbol, and P denotes a layer power control matrix.

That is, the terminal receives information about the layer power control matrix from the base station and multiplies transmitted data by the layer power control matrix.

Table 1 shows the layer power control matrix.

TABLE 1

| | Number of layer | | | |
|---|---|---|---|---|
| | 1 | 2 | 3 | 4 |
| Power control Matrix (P) | $[P_1]$ | $\begin{bmatrix} P_1 & 0 \\ 0 & P_2 \end{bmatrix}$ | $\begin{bmatrix} P_1 & 0 & 0 \\ 0 & P_2 & 0 \\ 0 & 0 & P_3 \end{bmatrix}$ | $\begin{bmatrix} P_1 & 0 & 0 & 0 \\ 0 & P_2 & 0 & 0 \\ 0 & 0 & P_3 & 0 \\ 0 & 0 & 0 & P_4 \end{bmatrix}$ |

In Table 1, if $P_1$, $P_2$, $P_3$ and $P_4$ are different, the transmission powers of the layers are different.

In addition, power control may be performed according to codewords. As shown in FIG. 5, one codeword may be mapped to a plurality of layers. Accordingly, the powers of the plurality of layers to which one codeword is mapped may be equalized. Tables 2 and 3 show examples of the power control matrix in the case where the power control is performed according to codewords.

TABLE 2

| | Number of layer | | | |
|---|---|---|---|---|
| | 1 | 2 | 3 | 4 |
| Power control Matrix (P) | $[P_1]$ | $\begin{bmatrix} P_1 & 0 \\ 0 & P_2 \end{bmatrix}$ | $\begin{bmatrix} P_1 & 0 & 0 \\ 0 & P_2 & 0 \\ 0 & 0 & P_2 \end{bmatrix}$ | $\begin{bmatrix} P_1 & 0 & 0 & 0 \\ 0 & P_1 & 0 & 0 \\ 0 & 0 & P_2 & 0 \\ 0 & 0 & 0 & P_2 \end{bmatrix}$ |

TABLE 3

| | Number of layer | | | |
|---|---|---|---|---|
| | 1 | 2 | 3 | 4 |
| Power control Matrix (P) | $[P_1]$ | $\begin{bmatrix} P_1 & 0 \\ 0 & P_2 \end{bmatrix}$ | $\begin{bmatrix} P_1 & 0 & 0 \\ 0 & P_2 & 0 \\ 0 & 0 & P_2 \end{bmatrix}$ | $\begin{bmatrix} P_1 & 0 & 0 & 0 \\ 0 & P_2 & 0 & 0 \\ 0 & 0 & P_2 & 0 \\ 0 & 0 & 0 & P_2 \end{bmatrix}$ |

Tables 2 and 3 show the case where the number of layers is 3 or 4 and the number of codewords is 2. In Table 2, if the number of layers is 4, a first codeword is mapped to first and second layers and a second codeword is mapped to third and fourth layers. In Table 3, if the number of layers is 4, a first codeword is mapped to a first layer and a second codeword is mapped to second, third and fourth layers.

In Tables 2 and 3, if the number of layers is 3, a first codeword is mapped to a first layer and a second codeword is mapped to second and third layers. Since the transmission power of the first layer is P1 and the transmission power of the second and third layers is P2, the transmission power of the first codeword is P1 and the transmission power of the second codeword is P2.

If power control is performed according to codewords, the number of codewords is equal to or less than the number of layers and thus overhead of information about the power control matrix is reduced.

In order to reduce overhead, the base station may transmit a power reference value and transmit a difference between the power of each layer and the power reference value or a ratio of the power of each layer to the power reference value.

Referring to FIG. 4, the terminal performs layer shifting (S430).

Figure 6:
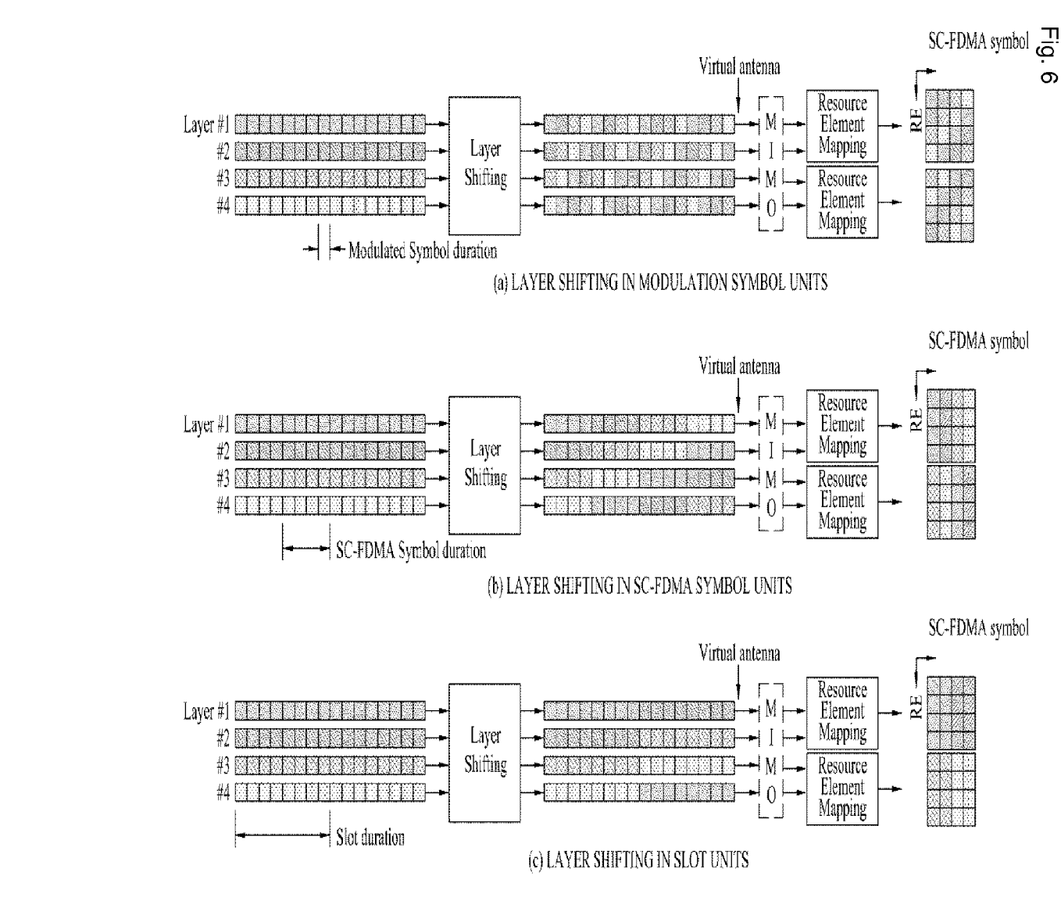
FIG. 6 is a diagram showing a layer shifting method.

FIG. 6 is a diagram showing a layer shifting method. FIG. 6(*a*) shows the case where the layer shifting is performed in modulation symbol units, FIG. 6(*b*) shows the case where the layer shifting is performed in SC-FDMA symbol units, and FIG. 6(*c*) shows the case where the layer shifting is performed in slot units. As shown in FIG. 6, the layer shifting circularly changes the layers in predetermined time units. Since the channel statuses of the layers are different, the layers are changed with time so as to equalize reception quality of data respectively mapped to the layers. That is, if layer shifting is not performed, data mapped to a layer with a good channel status has good reception quality, but data mapped to a layer with a bad channel status has bad reception quality. Accordingly, if the layers are circularly changed with time, the reception quality of data may be equalized.

The layer shifting may be performed after the layer power control is performed or the layer power control may be performed after the layer shifting is performed. That is, step S430 may be performed after step S420 or step S420 may be performed after step S430.

If the layer shifting is performed after the layer power control is performed, the power of each layer is shifted and the layer power is changed according to a time when the layer shifting is performed. That is, if the layer shifting is performed in modulation symbol units, the layer power is changed in modulation symbol units. Accordingly, since the layer power is changed with time before precoding, it is possible to obtain diversity gain.

If the layer power control is performed after the layer shifting is performed, the power of each layer is constant during one subframe. Accordingly, the characteristics of a precoder are maintained during one subframe and thus system performance is improved at a lower Doppler frequency.

Equation 6 shows a signal obtained by performing the layer shifting after the layer power control is performed, and Equation 7 shows a signal obtained by performing the layer power control after the layer shifting is performed.

$$\pi(m)Px(i) \qquad \text{Equation 6}$$

$$P\pi(m)x(i) \qquad \text{Equation 7}$$

where, m denotes a time or frequency unit in which the layer shifting is performed and π(m) denotes a layer shift matrix. If the layer shifting is performed in modulation symbol units, m and i are equalized.

The terminal multiplies a transmission signal by a precoding matrix so as to perform precoding (S440).

Equations 8 and 9 show precoded signals. Equation 8 shows the case where the layer shifting is performed after the layer power control is performed and Equation 9 shows the case where the layer power control is performed after the layer shifting is performed.

$$W_{Nt*R}\pi(m)Px(i) \quad \text{Equation 8}$$

$$W_{Nt*R}P\pi(m)x(i) \quad \text{Equation 9}$$

where, Nt denotes the number of transmission antennas, R denotes a rank number, and $W_{Nt*R}$ denotes a precoding matrix.

The terminal multiplies the transmitted signal by a physical antenna power control matrix so as to perform physical antenna power control (S450).

The terminal may perform only the layer power control or both the layer power control and the physical antenna power control.

Equations 10 and 11 show signals subjected to physical antenna power control. Equation 10 shows the case where the layer shifting is performed after the layer power control is performed and FIG. 11 shows the case where the layer power control is performed after the layer shifting is performed.

$$P_{phy}W_{Nt*R}(i)\pi(m)Px(i) \quad \text{Equation 10}$$

$$P_{phy}W_{Nt*R}P\pi(m)x(i) \quad \text{Equation 11}$$

where, $P_{phy}$ denotes a physical antenna power control matrix.

Tables 4 and 5 show examples of the physical antenna power control matrix.

TABLE 4

| Physical antenna power control matrix (2Tx) | Physical antenna power control matrix (4Tx) |
|---|---|
| $\begin{bmatrix} P_1^{phy} & 0 \\ 0 & P_2^{phy} \end{bmatrix}$ | $\begin{bmatrix} P_1^{phy} & 0 & 0 & 0 \\ 0 & P_2^{phy} & 0 & 0 \\ 0 & 0 & P_3^{phy} & 0 \\ 0 & 0 & 0 & P_4^{phy} \end{bmatrix}$ |

TABLE 5

| Physical antenna power control matrix (2Tx) | Physical antenna power control matrix (4Tx) |
|---|---|
| $\begin{bmatrix} P_1^{phy} & 0 \\ 0 & P_1^{phy} \end{bmatrix}$ | $\begin{bmatrix} P_1^{phy} & 0 & 0 & 0 \\ 0 & P_1^{phy} & 0 & 0 \\ 0 & 0 & P_1^{phy} & 0 \\ 0 & 0 & 0 & P_1^{phy} \end{bmatrix}$ |

Table 4 shows the case where the transmission powers of the physical antennas are different and Table 5 shows the case where the transmission powers of the physical antennas are equal.

Further, the layer shifting may not be performed. Equation 12 shows a transmitted signal in the case where the layer shifting is not performed and the layer power control is performed and Equation 13 shows a transmitted signal in the case where the layer shifting is not performed and the layer power control and the physical antenna power control are performed.

$$W_{Nt*R}(i)Px(i) \quad \text{Equation 12}$$

$$P_{phy}W_{Nt*R}Px(i) \quad \text{Equation 13}$$

Figure 7:
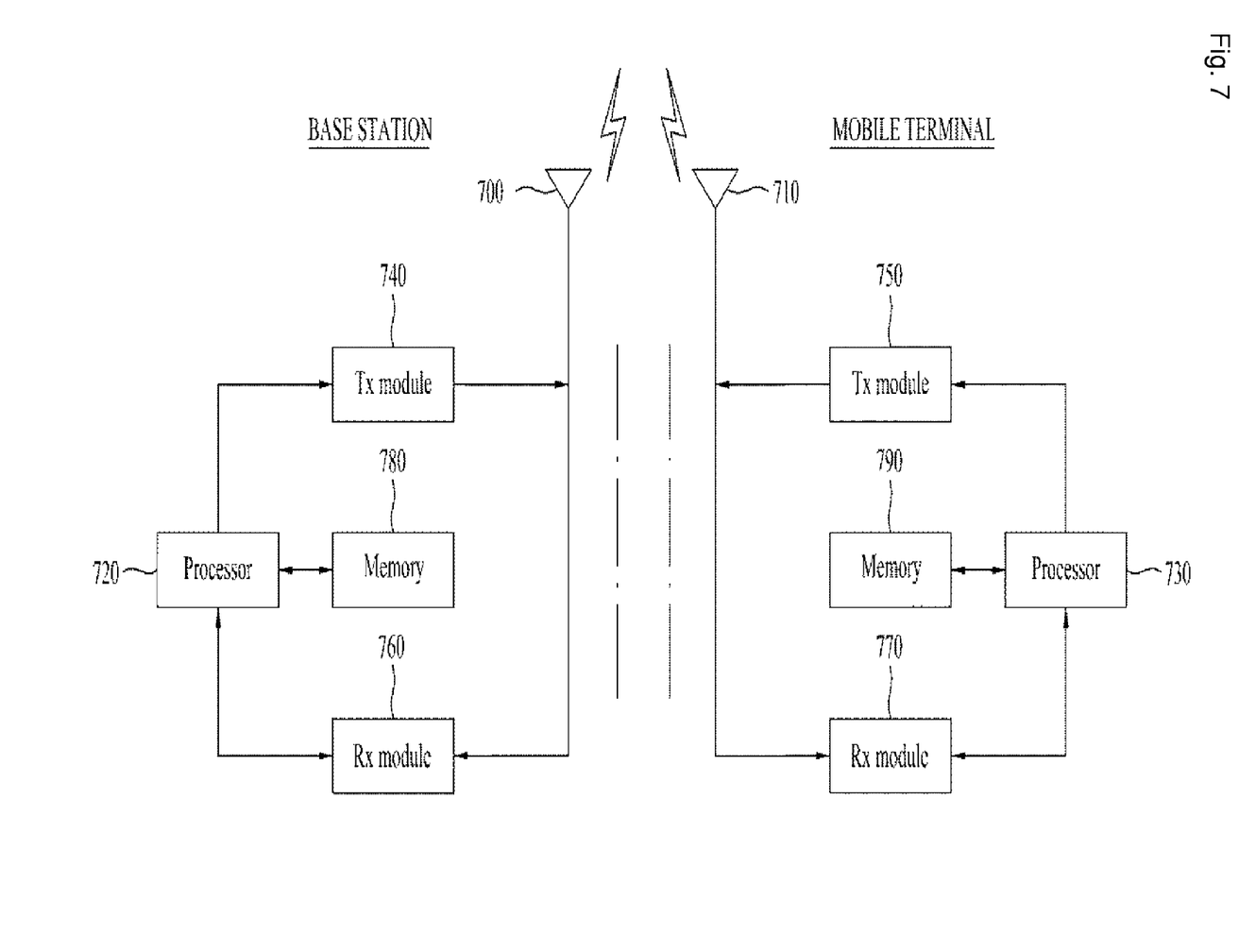
FIG. 7 is a diagram showing the configuration of a terminal and a base station through which the embodiments of the present invention may be implemented.

FIG. 7 is a diagram showing the configuration of a terminal and a base station, in which the embodiments of the present invention may be implemented, according to another embodiment of the present invention.

A mobile terminal (AMS) and a base station (ABS) include antennas 700 and 710 for transmitting or receiving information, data, signals and/or messages, transmission (Tx) modules 740 and 750 for controlling the respective antennas and transmitting messages to external devices, reception (Rx) modules 760 and 770 for controlling the respective antennas and receiving messages from external devices, memories 780 and 790 for storing information associated with communication between the terminal and the base station, and processors 720 and 730 for controlling the Tx modules, the Rx modules and the memories, respectively. At this time, the base station may be a femto base station or a macro base station.

The antennas 700 and 710 transmit the respective signals generated by the Tx modules 740 and 750 to the external devices or receive wireless signals from the external devices and send the wireless signals to the Rx modules 760 and 770. If a Multi-Input Multi-Output (MIMO) antenna function is supported, two or more antennas may be included.

The processors 720 and 730 generally control the overall operations of the base station and the mobile terminal, respectively. In particular, the processors may perform a control function for performing the embodiments of the present invention, a Medium Access Control (MAC) frame variable control function according to service characteristics and propagation environments, a handover function, an authentication and encryption function and the like. In addition, the processors 720 and 730 may further include encryption modules for controlling the encryption of various messages and timer modules for controlling the transmission and reception of various messages, respectively.

The Tx modules 740 and 750 perform predetermined coding and modulation with respect to signals and/or data, which are scheduled by the processors and will be transmitted to the external devices, and send the signals and/or data to the antennas 700 and 710.

The reception modules 760 and 770 perform decoding and demodulation with respect to the wireless signals received from the external devices through the antennas 700 and 710, restore the wireless signals to original data, and send the original data to the processors 720 and 730.

The memories 780 and 790 may store programs for processing and control of the processors and may temporally store input/output data (in case of a mobile station, uplink grant allocated by the base station, system information, a station identifier (STID), a flow identifier (FID), an action time, region allocation information, frame offset information, and the like).

The memory may include at least one of a flash memory type memory, a hard disk type memory, a multimedia card micro type memory, a card type memory (e.g., a SD or XD memory, or the like), a Random Access Memory (RAM), a Static Random Access Memory (SRAM), a Read-Only Memory (ROM), an Electrically Erasable Programmable Read-Only Memory (EEPROM), a Programmable Read-Only Memory (PROM), a magnetic memory, a magnetic disk, an optical disk.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The invention claimed is:

1. An uplink power control method in a terminal of a wireless communication system, the uplink power control method comprising:
    receiving, by the terminal, information about a layer power control matrix, the layer power control matrix configured to control a transmit power of each layer of R layers, where R is a number of layers;
    mapping, by the terminal, one or more codewords to the R layers;
    multiplying, by the terminal, the R layers by the layer power control matrix based on the information about the layer power control matrix;
    circularly shifting, by the terminal, the R layers by a predefined time unit;
    precoding, by the terminal, the circularly shifted R layers with a $N_t$-by-R precoding matrix to create $N_t$ precoded layers, where $N_t$ is a number of transmit antennas of the terminal; and
    controlling, by the terminal, a transmit power of each transmit antenna of the terminal by multiplying the $N_t$ precoded layers by a transmit antenna power control matrix.

2. The uplink power control method according to claim 1, wherein the information about the layer power control matrix includes a power reference value and a difference between a power of each of the R layers and the power reference value.

3. A terminal comprising:
    a receiver; and
    a processor operatively connected to the receiver and configured to
        receive information about a layer power control matrix, the layer power control matrix configured to control a transmit power of each layer of R layers, where R is a number of layers,
        map one or more codewords to the R layers,
        multiply the R layers by the layer power control matrix based on the information about the layer power control matrix,
        circularly shift the R layers by a predefined time unit,
        precode the circularly shifted R layers with a $N_t$-by-R precoding matrix to create $N_t$ precoded layers, where $N_t$ is a number of transmit antennas of the terminal, and
        control a transmit power of each transmit antenna of the terminal by multiplying the $N_t$ precoded layers by a transmit antenna power control matrix.

4. The terminal according to claim 3, wherein the information about the layer power control matrix includes a power reference value and a difference between a power of each of the R layers and the power reference value.

* * * * *